US009063695B2

(12) United States Patent
Williams et al.

(10) Patent No.: US 9,063,695 B2
(45) Date of Patent: Jun. 23, 2015

(54) PROVIDING SENDER-SELECTED SOUND ITEMS TO CONVERSATION PARTICIPANTS

(71) Applicant: Microsoft Corporation, Redmond, WA (US)

(72) Inventors: K. Aaron Williams, Redmond, WA (US); John R. Selbie, Seattle, WA (US); William S Archbell, Redmond, WA (US); Kandarp Jani, Seattle, WA (US); Troy A Schauls, Seattle, WA (US); Raghuveer Simha, Seattle, WA (US); Yuanquan Zhang, Redmond, WA (US); Thomas Aleksandr Barbour, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/147,132

(22) Filed: Jan. 3, 2014

(65) Prior Publication Data
US 2014/0123007 A1    May 1, 2014

Related U.S. Application Data

(63) Continuation of application No. 11/772,114, filed on Jun. 29, 2007, now Pat. No. 8,762,458.

(51) Int. Cl.
*G06F 15/16*    (2006.01)
*G06F 3/16*    (2006.01)
(Continued)

(52) U.S. Cl.
CPC ............ *G06F 3/162* (2013.01); *H04L 12/5815* (2013.01); *H04L 12/5845* (2013.01);
(Continued)

(58) Field of Classification Search
USPC ........................................................ 709/204
See application file for complete search history.

(56) References Cited

U.S. PATENT DOCUMENTS 6,185,603 B1    2/2001   Henderson et al.
6,760,754 B1    7/2004   Isaacs et al.
(Continued)

FOREIGN PATENT DOCUMENTS

JP    2000276185    10/2000
JP    200227112    1/2002
(Continued)

OTHER PUBLICATIONS

"Adobe Audition User Guide", Published Aug. 24, 2003 as per Internt Archive Wayback Machine, retrieved from the internet on Jan. 28, 2014 from http://web.archive.org/web/20030824074304/http://download.adobe.com/pub/adobe/magic/audition/win/2.02/audition_user_guide.pdf, 390 pages.
(Continued)

*Primary Examiner* — Hamza Algibhah
(74) *Attorney, Agent, or Firm* — Tom S Wong; Jim Ross; Micky Minhas

(57) ABSTRACT

Functionality is described for allowing a first user to select a sound item. The first user can use a first device to send this sound item to a second device operated by a second user. Upon the occurrence of a triggering event, the sound item selected by the first user can be presented by the second device to the second user. The first device and the second device may correspond to two devices in an Instant Messaging (IM) system. According to another illustrative aspect, functionality is described that allows the first user to select the new sound item from a source sound item by adjusting the position and/or size (e.g., width) of a graphical selection unit that is presented over a graphical depiction of the source sound item.

20 Claims, 8 Drawing Sheets

(51) Int. Cl.
    *H04L 12/58*     (2006.01)
    *G06Q 10/10*     (2012.01)
    *G06F 3/0484*     (2013.01)

(52) U.S. Cl.
    CPC ............. *H04L12/587* (2013.01); *H04L 51/043* (2013.01); *G06Q 10/10* (2013.01); *G06F 3/0484* (2013.01); *H04L 51/04* (2013.01)

(56) References Cited

U.S. PATENT DOCUMENTS

| | | | |
|---|---|---|---|
| 2001/0024965 | A1 | 9/2001 | Hayashi |
| 2002/0032020 | A1 | 3/2002 | Brown et al. |
| 2002/0145518 | A1 | 10/2002 | Smith et al. |
| 2003/0027604 | A1 | 2/2003 | Hayashi |
| 2003/0218631 | A1 | 11/2003 | Malik |
| 2003/0225848 | A1* | 12/2003 | Heikes et al. ................. 709/207 |
| 2004/0015610 | A1 | 1/2004 | Treadwell |
| 2004/0196963 | A1 | 10/2004 | Appelman et al. |
| 2004/0205775 | A1 | 10/2004 | Heikes et al. |
| 2004/0215728 | A1* | 10/2004 | Isaacs et al. ................. 709/206 |
| 2005/0030299 | A1 | 2/2005 | Bursill |
| 2005/0060161 | A1* | 3/2005 | Rudolph ....................... 704/500 |
| 2006/0075056 | A1* | 4/2006 | Isaacs et al. ................. 709/206 |
| 2006/0107045 | A1 | 5/2006 | Le Buhan et al. |
| 2006/0248150 | A1 | 11/2006 | Chaar et al. |
| 2006/0288077 | A1 | 12/2006 | Chen |
| 2007/0061403 | A1 | 3/2007 | Seaburg |
| 2007/0073848 | A1 | 3/2007 | Fratti |
| 2007/0123234 | A1 | 5/2007 | Kim |
| 2007/0244979 | A1* | 10/2007 | Isaacs et al. ................. 709/206 |
| 2007/0260968 | A1* | 11/2007 | Howard et al. ............ 715/500.1 |
| 2008/0107045 | A1 | 5/2008 | Berstis et al. |
| 2008/0167995 | A1* | 7/2008 | Cue et al. ........................ 705/59 |

FOREIGN PATENT DOCUMENTS

| | | |
|---|---|---|
| JP | 200251006 | 2/2002 |
| JP | 2003216187 | 7/2003 |
| JP | 2004312316 | 11/2004 |
| JP | 2005175723 | 6/2005 |
| JP | 2008530842 | 8/2008 |
| KR | 20020036290 A | 5/2002 |
| KR | 20040075412 A | 8/2004 |
| KR | 20050114805 A | 12/2005 |
| RU | 2287226 | 11/2006 |
| TW | 200701005 | 1/2007 |
| WO | WO2004079929 A2 | 9/2004 |
| WO | WO2006085069 | 8/2006 |

OTHER PUBLICATIONS

Copy of the Australian Office Action mailed Jan. 29, 2014 for Australian patent application No. 2012216544, a counterpart foreign application of U.S. Appl. No. 11/772,114, 4 pages.
Copy of the Malaysian Office Action mailed Jan. 15, 2014 for Malaysian patent application No. PI 20095060, a counterpart foreign application of U.S. Appl. No. 11/772,114, 3 pages.
Copy of the Australian Office Action mailed Mar. 12, 2014 for Australian patent application No. 2012216544, a counterpart foreign application of U.S. Appl. No. 11/772,114, 4 pages.
Copy of the Australian Office Action mailed Apr. 2, 2012 for Australian patent application No. 2008270833, a counterpart foreign application of U.S. Appl. No. 11/772,114, 2 pages.
Copy of the Chinese Office Action mailed Nov. 29, 2012 for Chinese patent application No. 200880022229.8, a counterpart foreign application of U.S. Appl. No. 11/772,114, 3 pages.
Copy of the Chinese Office Action mailed Feb. 25, 2013 for Chinse patent application No. 200880022229.8, a counterpart foreign application of U.S. Appl. No. 11/772,114, 6 pages.
Copy of the Chinese Office Action mailed Jul. 2, 2012 for Chinese Patent Application No. 200880022229.8, a counterpart foreign application of U.S. Appl. No. 11/772,114, 7 pages.
Translated copy of the Chinese Office Action mailed Aug. 31, 2011 for Chinese patent application No. 200880022229.8, a counterpart foreign application of U.S. Appl. No. 11/772,114, 18 pages.
"eMail Alert 3.0", retrieved on May 11, 2007, at <<http://www.tucows.com/preview/203799>>, Tucows Inc., 2006, pp. 2.
Copy of the Extended European Search Report mailed Mar. 9, 2012 for European patent application No. 08770427.6, 10 pages.
"Eudora Email 7.1", available at least as early as May 10, 2007, at <<http://eudora.com/download/eudora/windows/7.1/Eudora__.1__NF.pdf>>, QUALCOMM Incorporated, 2006, pp. 13.
Translated copy of the Israeli Office Action mailed May 5, 2013 for Israel patent application No. 201817, a counterpart foreign application of U.S. Appl. No. 11/772,114, 6 pages.
Copy of the Japanese Office Action mailed Mar. 9, 2012 for Japanese patent application No. 2010-514932, a counterpart foreign application of U.S. Appl. No. 11/772,114, 3 pages.
Office action for U.S. Appl. No. 11/772,114, mailed on Jun. 22, 2012, Williams et al., "Providing Sender-Selected Sound Items to Conversation Participants ", 14 pages.
Final Office Action for U.S. Appl. No. 11/772,114, mailed on Jun. 24, 2011, K. Aaron Williams, "Providing Sender-Selected Sound Items to Conversation Participants ", 14 pages.
Copy of the Russian Office Action mailed Apr. 11, 2012 for Russian patent application No. 2009148788, a counterpart foreign application of U.S. Appl. No. 11/772,114, 3 pages.
Copy of the Russian Office Action mailed Aug. 16, 2012 for Russian patent application No. 2009148788, a counterpart foreign application of U.S. Appl. No. 11/772,114, 6 pages.
Schmandt, et al., "Everywhere Messaging", available at least as early as May 10, 2007, at <<http://alumni.media.mit.edu/~nmarmas/IBM39-34.pdf>>, IBM, vol. 39, No. 3&4, 2000, pp. 660-677.
Copy of the Australian Office Action mailed Jun. 12, 2014 for Australian patent application No. 2012216544, a counterpart foreign application of U.S. Appl. No. 11/772,114, 4 pages.

\* cited by examiner

PROVIDING SENDER-SELECTED SOUND ITEMS TO CONVERSATION PARTICIPANTS

RELATED APPLICATIONS

This application is a continuation of U.S. patent application Ser. No. 11/772,114, filed on Jun. 29, 2007, the entire contents of which are incorporated herein by reference.

BACKGROUND

Instant Messaging (IM) systems allow users to communicate with each other in real-time fashion. Traditionally, an IM conversation between two IM users takes the form of text messages exchanged between the IM users. To provide a more interesting user experience, many IM systems supplement a conversation by presenting non-textual information to the IM users. For example, a first user can select a type of global sound that is presented when any other user logs into the IM system. In this case, when a second user logs into the IM system, the first user is notified of the log-in event by the presentation of the selected global sound. In this case, the first user is dictating the sound that will be later presented to himself or herself.

SUMMARY

Functionality is described for allowing a first user to select a sound item. The first user can use a first device to send this sound item to a second device operated by a second user. Upon the occurrence of a triggering event, the sound item selected by the first user can be presented by the second device to the second user. In this manner, the first user is dictating the sound item that is played back to the second user. The first device and the second device may correspond to two devices in an Instant Messaging (IM) system.

In one illustrative case, the first device can notify the second device of a new sound item by sending presence information to the second device. The presence information includes a reference to the new sound item. Upon discovering that the presence information identifies a new sound item, the second device can request the new sound item from the first device or from some other source. In one illustrative case, the first device can send the new sound item to the second device via a peer-to-peer communication channel. The new sound item can be sent via a queuing mechanism to help smooth the use of communication bandwidth.

According to another illustrative aspect, functionality is described that allows a user to select the new sound item from a source sound item. The functionality operates by presenting a graphical depiction of the source sound item together with a graphical selection unit. The graphical selection unit is placed over a segment of the source sound item. The functionality allows a user to adjust the position and size (e.g., width) of the graphical selection unit and to play back the segment demarcated by the graphical selection unit. By repeating these operations, the functionality can allow the user to select the new sound item through a trial-and-error approach.

Additional exemplary implementations features are described in the following.

Figure 1:
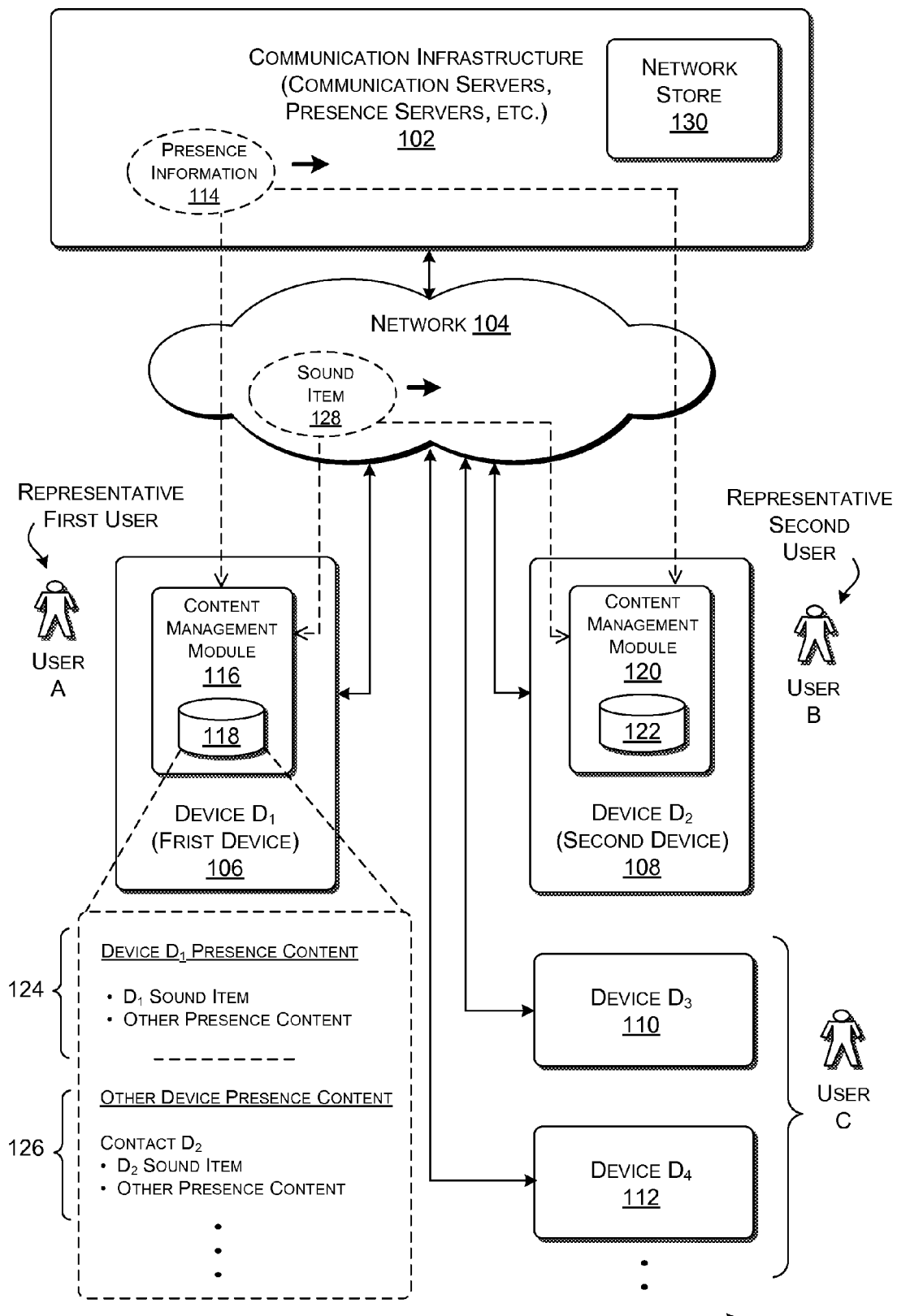
FIG. 1 shows a system for exchanging messages and sound items among users.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for using a first device to provide a sound item to a second device. The second device presents the sound item upon the occurrence of a triggering event. This disclosure also provides functionality for selecting the sound item using a user interface presentation. The functionality can be manifested in various systems, apparatuses, modules, procedures, storage mediums, data structures, and other forms.

The term "sound item" can encompass any type of content that can be presented in audible form. Types of sound items include music content, spoken word content, various non-verbal noises (e.g., a barking dog, rushing water, etc.).

As a preliminary note, any of the functions described with reference to the figures can be implemented using software, firmware, hardware (e.g., fixed logic circuitry), manual processing, or a combination of these implementations. The term "logic, "module," "component," "system" or "functionality" as used herein generally represents software, firmware, hardware, or a combination of the elements. For instance, in the case of a software implementation, the term "logic," "module," "component," "system," or "functionality" represents program code that performs specified tasks when executed on a processing device or devices (e.g., CPU or CPUs). The program code can be stored in one or more computer readable memory devices.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, static, etc.). The term machine-readable media also encompasses transitory forms for representing information, including various hardwired and/or wireless links for transmitting the information from one point to another.

Certain features are described flow chart form. In this mode explanation, certain operations are described as constituting distinct blocks performed in a certain order. Such implementations are exemplary and non-limiting. Certain blocks described herein can be grouped together and performed in a single operation, and certain blocks can be performed in an order that differs from the order employed in the examples set forth in this disclosure. The blocks shown in the flowcharts can be implemented by software, firmware, hardware, manual processing, any combination of these implementations, and so on.

This disclosure includes two sections. Section A describes one illustrative system for propagating and playing back sound items. Section B describes the operation of the system of Section A in flowchart form.

A. Illustrative System

FIG. 1 shows a system 100 that allows users to communicate with each other. In one illustrative implementation, the system 100 corresponds to an Instant Messaging (IM) system that allows users to communicate with each other in a real-time fashion. That is, the IM system allows any user who maintains an online presence to communicate with one or more contacts (e.g., "buddies") who also maintain an online presence.

The system 100 includes communication-related infrastructure 102 for allowing users to communicate with each other via a network 104. The users operate respective user devices. FIG. 1 shows only four representative user devices (106, 108, 110, and 112), although it will be understood that the system 100 can accommodate any number of user devices, e.g., thousands of user devices, millions of user devices, etc. The following explanation will first provide introductory information regarding the principal components of the system 100. The explanation will then delve into the application of the system 100 to the propagation of sound items among user devices.

The communication infrastructure 102 can include various server-type computers, data stores, and/or other data processing equipment. For example, the communication infrastructure 102 can include connection-related functionality (not shown) for managing connection among user devices. The communication infrastructure 102 can also include presence-related functionality (not shown) for managing and disseminating presence information within the system 100. Presence information includes data which generally describes a user's involvement in the system 100 as a communication participant. Without limitation, presence information can convey the network-related status of the user, such as whether the user is currently online, away, busy, and so forth. The presence information can also convey personal information associated with the user. The personal information may reveal a personalized textual message associated with the user, a personalized display name, and so forth. As will be discussed, the presence information can also reference a sound item associated with the user. In one illustrative case, the presence information can be expressed using the eXtensible Markup Language (XML) format.

In operation, the presence-related functionality of the communication infrastructure 102 can propagate presence information among groups of users. For example, consider the case in which a first user operates a first user device 106 and a second user operates a second user device 108. The second user is one of the contacts of the first user. In this illustrative scenario, the presence-related functionality can forward presence information 114 associated with a first device 106 to the second device 108. In one case, this presence information 114 can alert second device 108 that the first user has just logged into the system 100, and so on.

The network 104 can represent a local area network (LAN), a wide area network (WAN) (e.g., the Internet), or some combination of LAN(s) and WAN(s). The network 104 can be implemented by any combination of wireless links, hardwired links, routers, gateways, name servers, and so forth, and can be governed by any protocol or combination of protocols. In one case, system 100 allows user devices (106, 108, 110, 112) to communicate with each other using the resources of both the network 104 and the communication infrastructure 102. In another case, the system 100 allows user device (106, 108, 110, 112) to communicate with each other using only the resources of the network 104, that is, without relying on the communication infrastructure 102 or by only minimally relying on the communication infrastructure 102; in other words, in the system 100 is configured to also allow the user devices to directly communicate with each other in peer-to-peer (P2P) fashion. One mechanism for facilitating P2P communication in an IM system is described in co-pending U.S. Ser. No. 10/611,575, filed on Jul. 1, 2003, entitled "Transport System for Instant Messaging," naming the inventors of John Holmes, et al.

Each user device can correspond to any type of data processing device. For example, a user device may correspond to a personal computer, a laptop computer, a personal digital assistant (PDA), a mobile telephone device, a game console, a set-top box associated with a television set, and so on. In several of the examples to follow, the first device 106 is used to transmit a sound item to the second device 108. The sound item is then played back by the second device 108. As noted above, the first device 106 is operated by a user referred to as a first user. The second device 108 is operated by a user referred to as a second user. It will be appreciated that this example is merely illustrative. For instance, in another scenario, the first device 106 can act as a receiver of a sound item provided by the second device 108. Further, reference to a single pair of communication participants is merely illustrative. For instance, in another case, the first device 106 can forward a sound item to plural recipient devices corresponding to plural respective contacts.

Each device can include a content management module for managing content items in a store. For example, the first device 106 includes a content managing module 116 for managing content items stored in a store 118. The second device 108 includes a content management module 120 for managing content items stored in a store 122. As will be described more fully below, a content management module can perform various roles. According to one role, a content management module can coordinate sending a content item to another user device and receiving a content item from another user device. A content management module can also coordinate the presentation of a content item.

With the above introduction, it is now possible to discuss the application of the system 100 to the propagation of sound items among user devices. As described above, a sound item corresponds to any content item that can be audibly presented to a user. Representative types of sound items include music items, spoken-word items, non-verbal noise items, and so forth. A user may select a sound item to represent himself or herself to another user (or users), e.g., as a type of calling card or the like. For example, a user may select her sound item to correspond to a few seconds of her favorite song. Another user may select her sound item to correspond to an inspirational spoken-word quotation. Another user may select his sound item to correspond to a non-verbal sound that he considers humorous, and so on.

In a typical scenario, the first user may use his or her device 106 to provide the sound item to the second device 108. Upon the occurrence of a triggering event associated with the first user, the second device 108 can play the sound item to the second user. For example, a triggering event may occur when the first user logs into the system 100. In this manner, the first user can dictate (with certain limitations and exceptions) the sound item that is played by the second device 108 to the second user.

To function as described above, as a first task, the first user selects a sound item. To facilitate this operation, the first user may invoke a content creation module (to be discussed in detail later). The content creation module displays a user interface presentation that provides a graphical depiction of a source sound item (such as a song file). Using this user interface presentation, the first user may select a segment of the source sound item. The selected segment corresponds to the sound item that is subsequently used to represent the first user to other users. The content management module 116 of the first device can store the selected sound item in its local store 118.

More specifically, the store 118 of the first device 106 can include various items 124 associated with the first user. One type of item corresponds to the sound item selected by the first user to represent himself or herself to others. Another item may correspond to a personal text message defined by the first user. Another item may correspond to an image selected by the first user, and so on. The store 118 can also include various other items 126 associated with other users. For example, the first user may have configured the first device 106 to communicate with various contacts (e.g., "buddies"). The other items 126 may provide sound items and other content items defined by the user's contacts. For example, assume that the first user has selected the second user as a contact with whom to communicate. In this case, the store 118 can include a sound item selected by the second user, an image selected by the second user, and so on.

Assume that the first user has just selected a new sound item in the manner described above (or modified a pre-existing sound item to in effect create a new sound item). The content management module 116 is invoked at this point to notify the first user's contacts about the existence of the new sound item. The content management module 116 performs this task by preparing presence information 114 which identifies the new sound item, along with other characteristics of the user's presence as discussed above. More specifically, the presence information 114 can include reference information which provides a link to the new sound item, but the presence information 114 does not include the actual content of the sound item itself. One or more presence servers (not shown) in the communication infrastructure 102 can receive this presence information 114 and disseminate it to all of the first user's contacts that happen to be online at the moment.

Assume that the second device 108 is online when the presence information 114 is sent. The second device 108 will receive the presence information 114 and process it to determine whether it includes any new information. For example, the content management module 120 of the second device 108 can determine whether the reference information contained in the presence information 114 (which identifies a sound item) differs from previously received reference information. Or perhaps the second device 108 has never received a sound item from the first user, in which case the second device 108 will consider the reference information contained in the newly received presence information 114 as identifying a new sound item.

The second device 108 responds to a determination that a new sound item has been received by requesting the new sound item from the first device 106. The first device 106 responds to this request by supplying the new sound item to the second device 108. The second device 108 then stores the new sound item in its own store 122. In one illustrative case, the request and response exchange between the first device 106 and the second device 108 can be conducted using peer-to-peer (P2P) communication. For example, FIG. 1 shows the transfer of a sound item 128 from the first device 106 to the second device 108 via a P2P path. As illustrated, the P2P path does not use the resources of the communication infrastructure 102, or may use only some aspects of the resources of the communication infrastructure 102. In another case, the request and response exchange conducted between the first device 106 and the second device 108 can be conducted using the resources of the communication infrastructure 102 if it is determined that a P2P channel is not available due to any one or more of various environment-specific factors. In still another case, the request and response exchange conducted between the first device 106 and the second device 108 can be always conducted using the resources of the communication infrastructure 102.

Once the second device 108 receives and stores a sound item from the first user it can play back this sound item to the second user in response to one or more types of triggering events, as discussed below:

One type of triggering event occurs when the first user logs into the system 100. In this circumstance, the second device 108 can play the sound item to notify that second user that the first user is available to converse with.

Another type of triggering event occurs when the first user logs off of the system 100.

Another type of triggering event occurs when the first user sends a message to the second user.

Another type of triggering event occurs when the first user invokes any type of special communication option directed to the second user. For example, the first user can invoke a nudge command, which causes a user interface presentation at the second device 108 to shake or engage in some other movement. Or the first user can invoke a wink command, which causes a graphical feature in the user interface presentation of the second device 108 to perform a prescribed behavior. In each of these circumstances, the sound item is presented to the second user when the special communication option is invoked.

Still other types of triggering events may cause the playback of the sound item. The above list is representative and non-exhaustive.

The above protocol for receiving and playing back sound items can be performed by any device in the system 100. For example, the second device 108 can forward a sound item selected by the second user to the first user. Then, when the second user engages in any of the behavior described above, the first device 106 can play back the second user's sound item. Finally, it should be noted that any user will typically include multiple contacts. For example, the first user will typically have multiple contacts. In this case, the first user device 106 can send the first user's sound item to all of the devices associated with that user's contacts.

The above-described item dissemination and playback procedure corresponds to one mode of operation of the system 100. The following explanation identifies various additional and/or alternative features of the system 100

According to one feature, assume that the first user selects a new sound item while offline and then later goes online.

Further assume that at the time the first user goes on online, the second user is also online. In this case, the second device 108 will seek to announce the online presence of the first user, but the second device 108 may not have obtained the new sound item from the first user device 106. To address this situation, the second device 108 can play another sound item, such as an old sound item associated with the first user, or any type of sound item previously selected by the second user (or a default sound item). This provision is useful so as not to delay the log-in procedure. The second device 108 will eventually receive an opportunity to obtain the new sound item from the first device 106. Upon the next triggering event, the second device 108 can then play the new sound item.

According to a second feature, assume that a user operates plural user devices under a single account. For example, as illustrated in FIG. 1, user C operates both device 110 and device 112. For instance, user C may operate device 110 as a work computer ("work device" 110) and may operate device 112 as a home computer ("home device" 112). Assume next that user C selects a new sound item at his work device 110. Assume further that at the time of creation, the user is not simultaneously logged onto the home device 112. In this circumstance, the work device 110 can forward the new sound item to a network store 130 provided by the communication infrastructure 102. When user C then later logs onto the home device 112, the communication infrastructure 102 can provide a notice to the home device 112, alerting it that a new sound item has been created by the work device 110. The home device 112 can then retrieve the sound item from the network store 130 and store the sound item in its local memory. In this manner, the system 100 can synchronize the content stores of all user devices associated with a single account.

According to a third feature, assume that the first user has a large number of contacts. When the first user creates a new sound item, presence information will be propagated to all of her contacts, notifying the contacts of the new sound item. Each of the devices operated by the contact ("contact devices") can then be expected to request the new sound item. This, in turn, will require the first user device to provide the new sound item to all of the contact devices that request it. Such a large number of requests and responses can potentially make large bandwidth demands on the system 100. To help ameliorate this situation, the system 100 can be configured to stagger the dissemination of sound items in various ways. According to a one technique, each of the contact devices that needs the new sound item can place an action item in a queue, and then request the new sound item when the action item comes due in the queue. Communication bandwidth can be smoothed out insofar as the contact devices are not requesting the new sound item at the same time.

According to a fourth feature, according to the scenario described above: (1) the first device 106 creates a new sound item; (2) the first device 106 notifies the second device 108 of the new sound item; (3) the second device 108 asks the first device 106 for the new sound item; and (4) the first device 106 supplies the new sound item to the second device 108. In a variation of this technique: (1) the first device 106 creates a new sound item; (2) the first device 106 supplies the new sound item to the network store 130; (3) the first device 106 notifies the second device 108 of the new sound item; and (4) the second device 108 requests and obtains the new sound item from the network store 130 (rather than from the first device 106).

Figure 2:
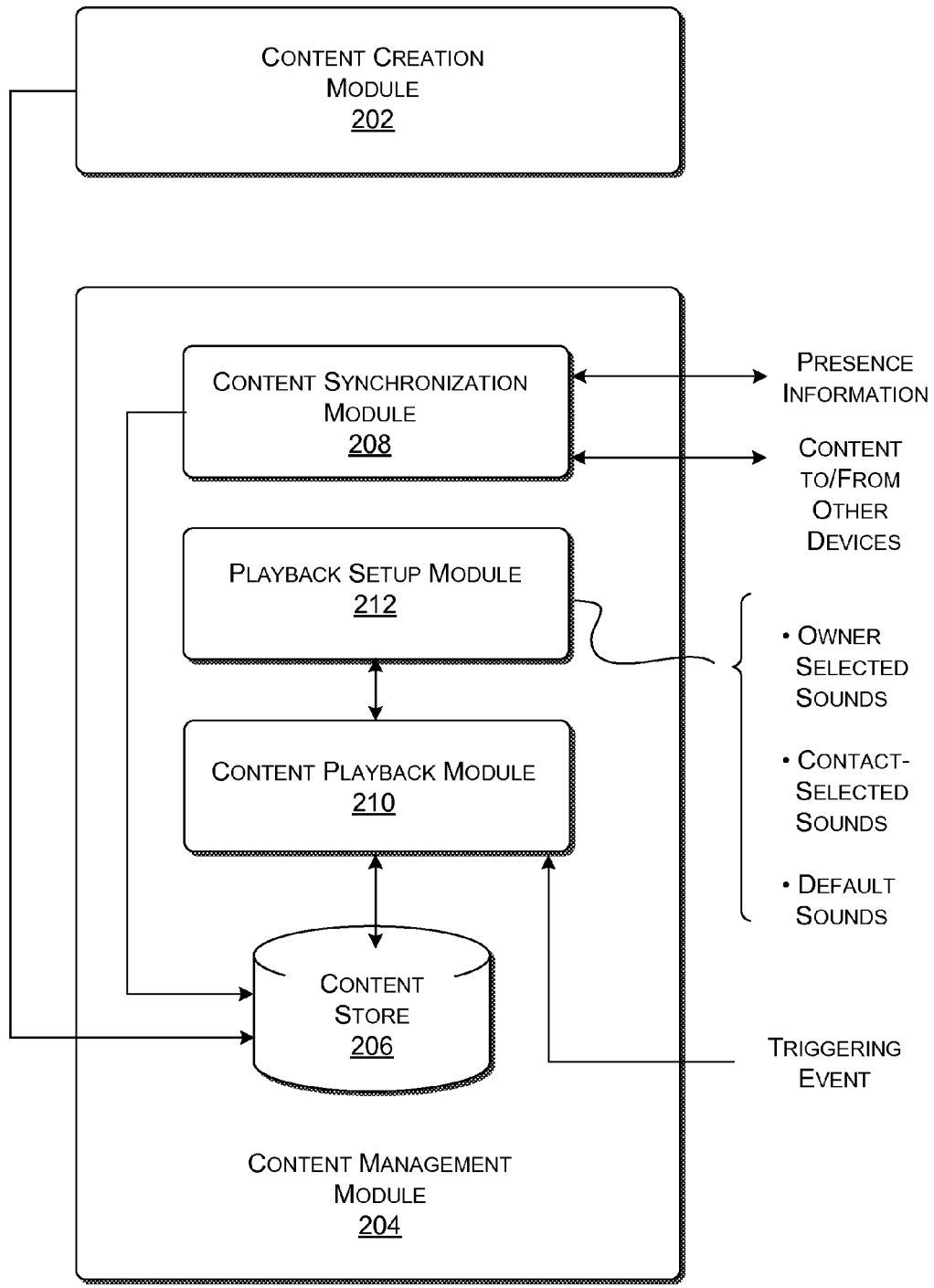
FIG. 2 shows a content creation module and a content management module for use in the system of FIG. 1.

Advancing to FIG. 2, this figure shows additional information regarding functionality available to a user device to create and manage sound items. In one case, each user device can include separate logic which implements the functionality shown in FIG. 2. In another case, one or more aspects of the functionality shown in FIG. 2 can be shared by multiple user devices. The user who operates the functionality shown in FIG. 2 may be acting in the capacity of the above-described first user (who creates a new sound item and propagates it to other devices) or a second user (who receives the sound item from the first user and plays it back upon a triggering event).

The functionality includes a content creation module 202. The content creation module 202 allows the user to create a new sound item or modify an existing sound item. The content creation module 202 can perform this task by providing a user interface presentation to the user. The user may define the sound item using the user interface presentation in the manner described more fully below in the context of the discussion of FIG. 4.

The functionality shown in FIG. 2 also includes a content management module 204. The content management module 204 can store content items (including sound items) created by a user within a content store 206. The content management module 204 can also store content items (including sound items) created by other users in the store 206. The content management module 204 also manages the manner in which content items are propagated to other devices, received from other devices, consumed, and so on.

More specifically, the content management module 204 includes a content synchronization module 208. The purpose of the content synchronization module 208 is twofold. First, the content synchronization module 208 provides presence information to the user's contacts and also receives presence information from these contacts. The presence information identifies features of a user's presence within the system 100. For instance, the presence information identifies a sound item created by a user. The content synchronization module 208 also operates by sending a content item to another device when requested by the other device. The content synchronization module 208 can also request that another device forward a content item to it. For instance, assume that the content synchronization module 208 first receives presence information from another device that identifies various content items, including a new sound item. The content synchronization module 208 can determine whether it already includes the new sound item. If not, the content synchronization module 208 can request the other device to provide the new sound item. As described above, the content synchronization module 208 can optionally apply a queue-based protocol to request a content item.

The content management module 204 also includes a content playback module 210. The content playback module 210 plays back a sound item associated with another user when a triggering event occurs that pertains to that other user. For example, the triggering event may occur when that other user logs onto the system 100. In response to this event, the content playback module 210 retrieves the sound item corresponding to the user who has logged in (e.g., the first user) and plays it (e.g., for the second user).

The content management module 204 also includes a playback setup module 212. The playback setup module 212 defines various conditions for playing back a sound item. For example, in one case, a controlling user (meaning a user who operates the user device associated with the content management module 204) can choose to override the sound item defined by one or more other users by entering an appropriate instruction via the playback setup module 212. This override instruction will prevent the sound item for another user from playing in response to a triggering event. In lieu of the sound item defined by another user, the controlling user can define other sounds to be played in response to a triggering event. In one case, the controlling user can define a custom sound to be presented when a particular other user engages in behavior which constitutes a triggering event. In another case, the controlling user can define a global sound to be presented when any of the controlling user's contact performs a triggering event. In these two override scenarios, the controlling user is the entity which is choosing sounds to be played back upon triggering events; the other users that trigger the presentation of sounds are not dictating what sounds should be played.

Figure 3:
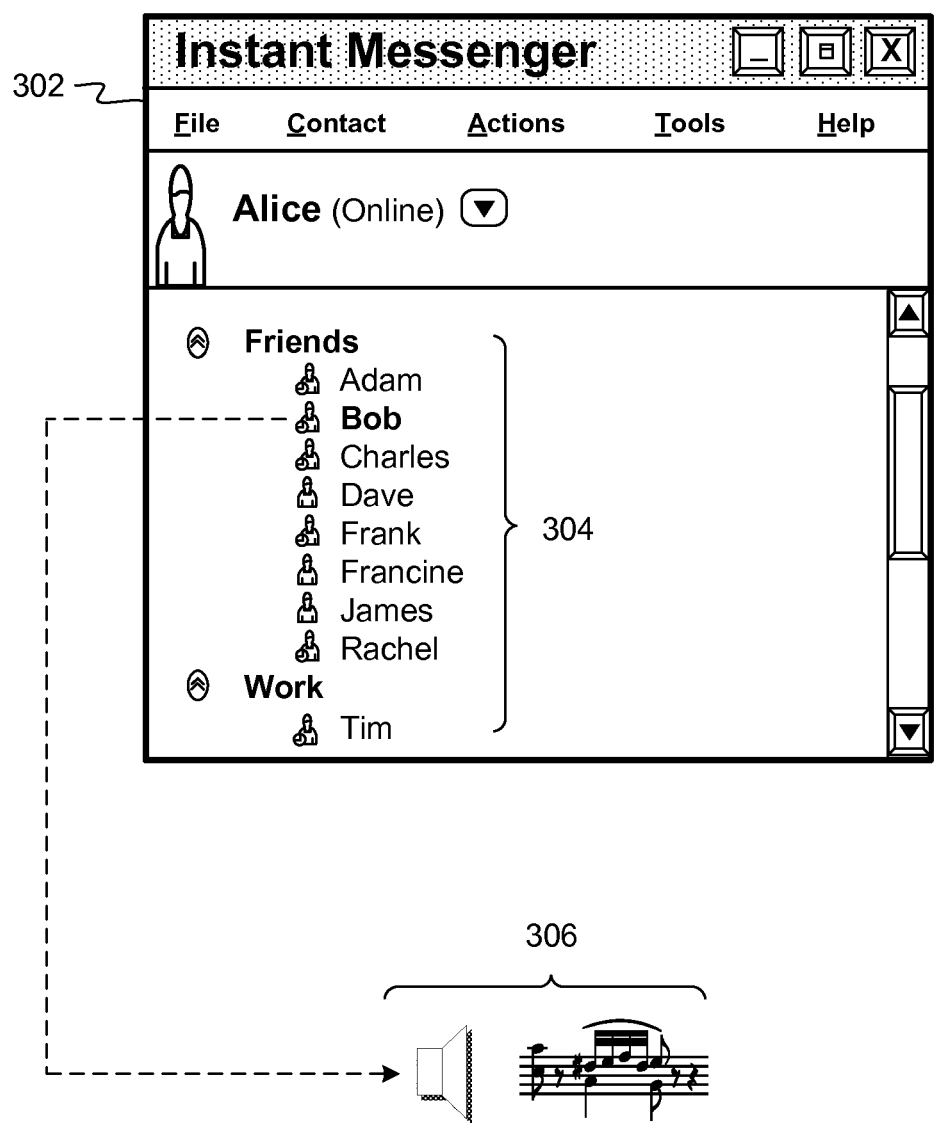
FIG. 3 shows a user interface presentation for use by a user in communicating with another user using the system of FIG. 1.

FIG. 3 shows a communication-related user interface presentation 302 that can be presented on any user device. Assume that the user interface presentation 302 is provided to a user named Alice. The user interface presentation 302 includes a list 304 that identifies Alice's contacts. These are people or other entities (e.g., automated programs) that Alice has selected as authorized communication participants. The user interface presentation 302 also includes a region (not shown) that allows Alice to compose messages to any contact(s) and to receive messages from the contact(s).

The content playback module 210 associated with Alice's user device will present a sound item to Alice when a triggering events occurs that is associated with any of her contacts. For example, assume that one of Alice's contacts is Bob. When Bob logs into the system, Alice's user device will be notified of Bob's online status. In response, Alice's content playback module 210 can also play a sound item that Bob himself has selected for playback on Alice's device. The graphical depiction of a speaker and music 306 indicate that Alice receives an audible presentation of a musical clip chosen by Bob to announce his online presence.

Figure 4:
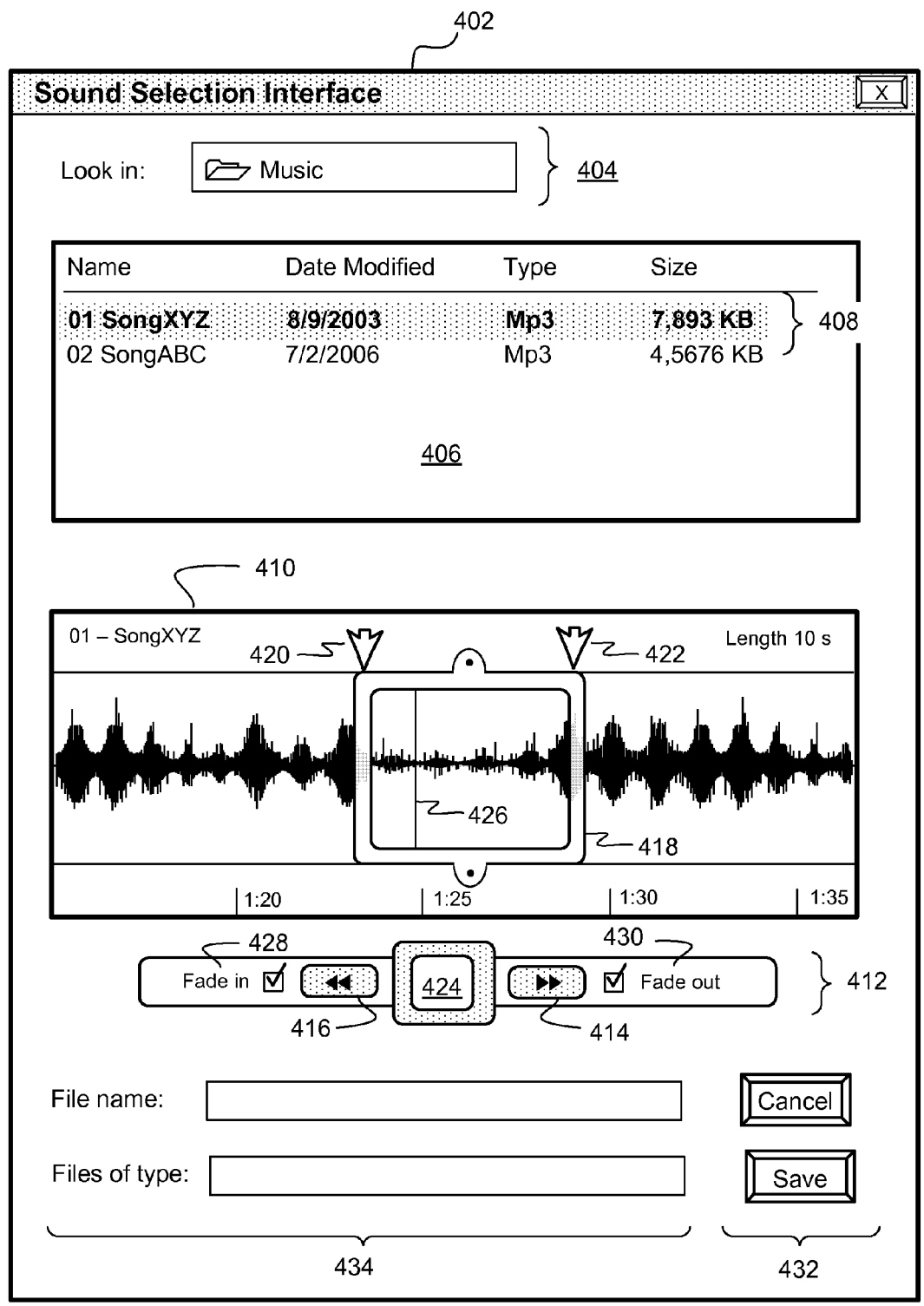
FIG. 4 shows a user interface presentation for use by a user in creating a new sound item.

FIG. 4 shows a sound selection user interface presentation 402. The content creation module 202 (of FIG. 2) presents this user interface presentation 402 to a user. The user interface presentation 402 allows the user to create a new sound item or modify an existing sound item.

The user interface presentation 402 includes an input section 404 that allows a user to select a file folder that contains source sound items. A source sound item corresponds to a previously created audio file from which the user may select a new sound item. For example, a source sound item can correspond to a commercially-produced song. Or the source sound item may correspond to a personal recording made by the user, e.g., providing spoken word content, music, non-verbal sounds, and so forth. In any case, the user may select a small snippet from the source sound item to produce a new sound item. In one case, the user can select any portion of the source sound item, but the selected portion cannot exceed a specified maximum length of time, e.g., without limitation, five seconds. In another case, no restrictions are placed on the length of a sound item. It is assumed that the user owns the property rights to the source sound item that is to be used to select the new sound item.

Upon the user selecting a file folder (in field 404), the user interface presentation 402 can list the contents of the folder in field 408. In this representative case, a file "Music" includes two source sound items, a song named SongXYZ and a song named SongABC. As indicated by the shading in FIG. 4, the user has selected the song SongXYZ from which to select a new sound item.

Upon the user selecting the song SongXYZ, the user interface presentation 402 displays a graphical depiction of the SongXYZ in a graphical presentation field 410. The graphical presentation field 410 includes a depiction of part of the sound wave of SongXYZ. For example, assuming that the entire sound is three minutes long, the graphical presentation field 410 can show a sound wave associated with a ten second portion of the song. The user interface presentation 402 includes a sound navigation field 412. The user can advance to different parts of the song by activating a fast forward control 414 or a rewind control 416. These commands (414, 416) will prompt the graphical presentation field 410 to display a different part of the song. The user can also display different parts of the song using other modes of interaction, such as by clicking on the graphical depiction of the song and dragging the depiction in one direction or the other (e.g., to the right or the left).

The graphical presentation field 410 includes a graphical selection unit 418 that is presented over the graphical depiction of the song. The graphical selection unit 418 can be formed as a window. The window has a first end identified by an arrow 420 and a second end identified by an arrow 422. The first end and the second end demarcate a segment of the song having a predetermined time span. The graphical selection unit 418 includes a transparent middle section that allows a user to see the portion of the song demarcated by the first end and the second end.

The graphical selection unit 418 can be moved to a different location in the song, e.g., by clicking on and dragging the graphical selection unit 418 or by entering some of the movement instruction. The user can also adjust the width of the graphical selection unit 418. The user can perform this task by adjusting either (or both) of the arrows (420, 422) that demarcate the edges of the graphical selection unit 418. Through these operations, the user can define the portion of the song that is selected as the new sound item. In other words, the portion of the song that is demarcated by the edges of the graphical selection unit 418 corresponds to the new sound item.

To ensure that the correct portion of the song has been selected, the user interface presentation 402 allows the user to play back the sound item demarcated by the graphical selection unit 418. The user can perform this task by actuating a start/stop control 424. That is, the control 424 can be used to transition from a no-play state to a play state by actuating the control 424; the same control 424 can be used to transition from a play state to a no-play state by actuating the control 424. When an instruction is made to play the sound item, the graphical selection unit 418 can show the progress of the playback using a line 426; namely, the line 426 moves from left to right with the advance of the content that is being played back.

In a typical selection process, the user is expected to use a trial-and-error approach to select a desired portion of the song. For example, the user can select an initial position and width of the graphical selection unit 418 and then actuate the play control 424. If the user is not pleased with the portion of the song that has been selected, the user can modify the position and/or width of the graphical selection unit 418, after which the user can play the selected content again. The user can repeat this procedure any number of times until he is satisfied with the selected portion.

The user can optionally make create a more audibly pleasing sound item by adding a fade-in effect (at the beginning of the sound item) and/or a fade-out effect (at the end of the sound item). The user may add these types of transition effects by selecting a fade-in control 428 and a fade-out control 430.

Once the user is satisfied with the selected sound item, the user can activate a save control 432 to save the new sound item. The user can select the name of the sound item via field 434. Alternatively, the user can activate a cancel control to abandon the sound item selection procedure.

In one case, the user can define a sound item to be displayed for all of his or her contacts upon the occurrence of any triggering event. In another case, the user can define different sound items for different users or groups of users. Alternatively or in addition, the user can define different sound items for different triggering events.

Figure 5:
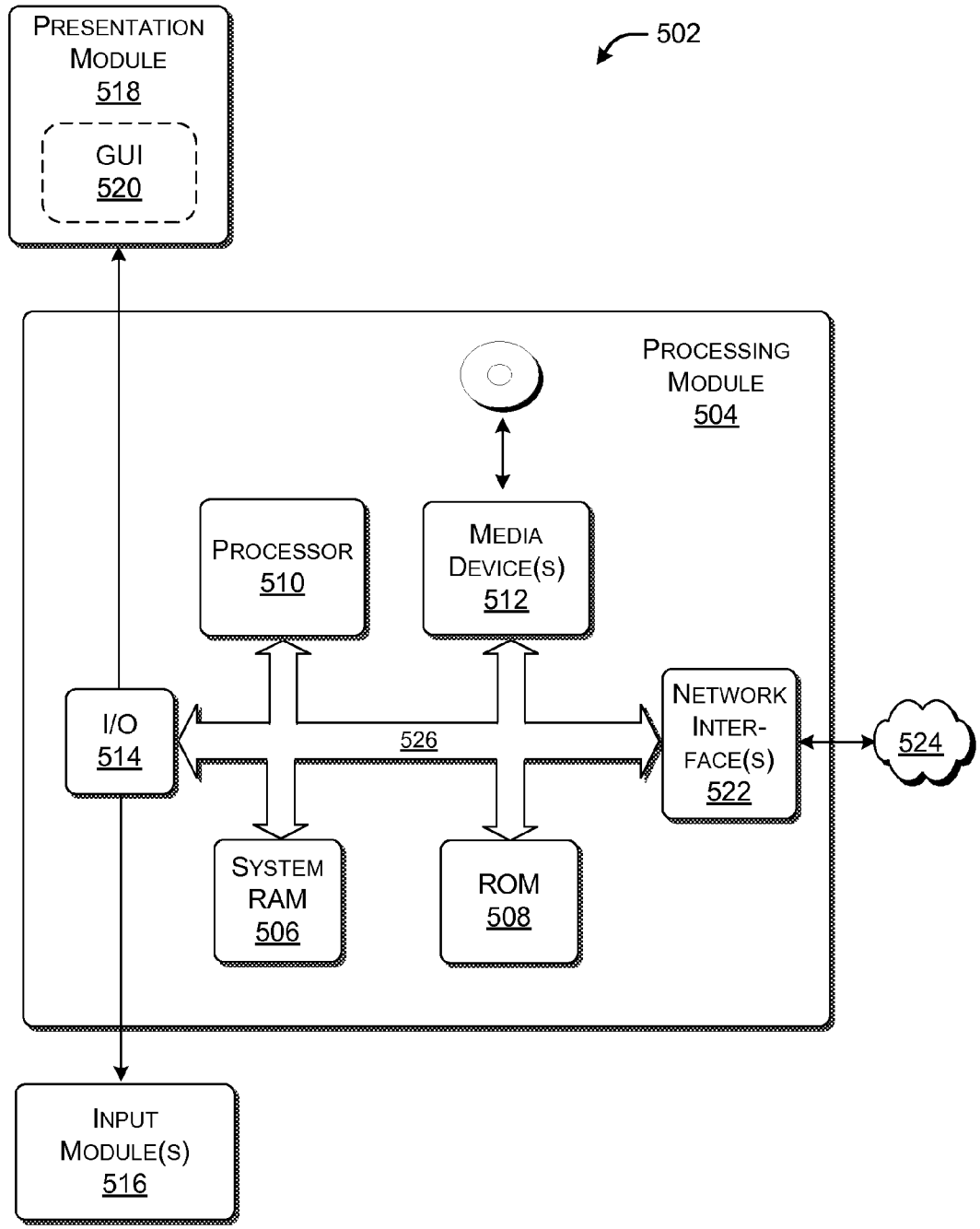
FIG. 5 shows illustrative processing functionality that can be used to implement any aspect of the system of FIG. 1.

Advancing to FIG. 5, this figure sets forth illustrative processing functionality 502 that can be used to implement any aspect of system 100 shown in FIG. 1. In one non-limiting case, for instance, the processing functionality 502 may represent any computer machine used by the system 100, e.g., to implement any aspect of any user device and/or any aspect of the communication infrastructure 102, and so forth.

The processing functionality 502 can include a processing module 504 for implementing various processing functions. The processing module 504 can include volatile and non-volatile memory, such as RAM 506 and ROM 508, as well as one or more processors 510. The processing functionality 502 can perform various operations identified above when the processor(s) 510 executes instructions that are maintained by memory (e.g., 506, 508, or elsewhere). The processing functionality 502 also optionally includes various media devices 512, such as a hard disk module, an optical disk module, and so forth.

The processing functionality 502 also includes an input/output module 514 for receiving various inputs from the user (via input module 516), and for providing various outputs to the user (via presentation module 518). The presentation module 518 can provide a graphical user interface (GUI) 520. The processing functionality 502 can also include one or more network interfaces 522 for exchanging data with other devices and systems via one or more communication conduits 524. One or more communication buses 526 communicatively couple the above-described components together.

B. Illustrative Procedures

Figure 6:
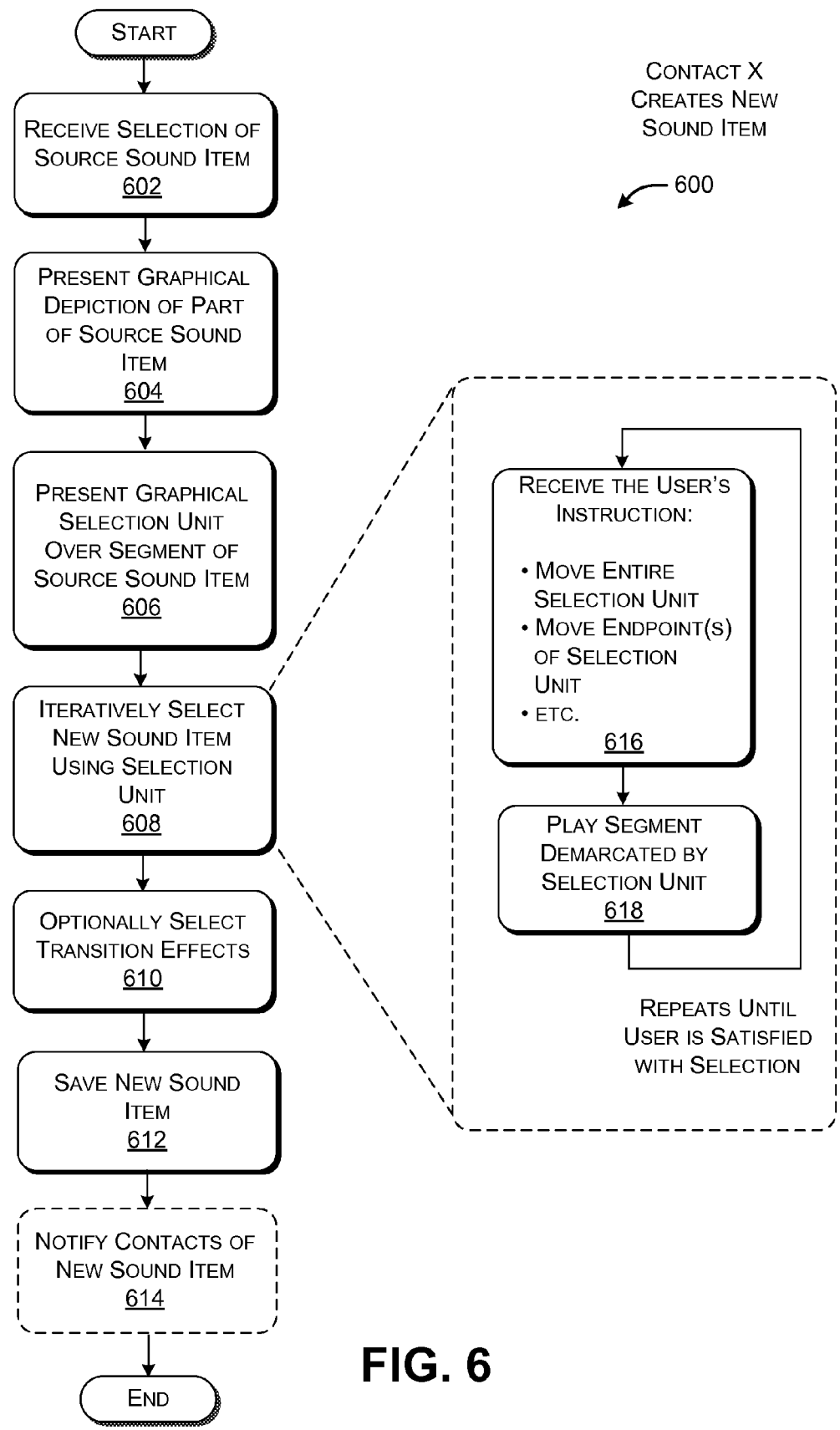
FIG. 6 is a flowchart which shows an illustrative procedure for creating a new sound item.

FIG. 6 shows an illustrative procedure 600 for creating a new sound item. As described in Section A, the content creation module 202 is one tool for allowing a user to create the sound item. The content creation module 202 presents a user interface presentation 402 that allows a user to iteratively select a desired portion of a source sound item.

In block 602, the content creation module 202 receives the user's selection of a source sound item. This may correspond to the user selecting a desired folder and then selecting a source sound item that is included in the folder.

In block 604, the content creation module 202 presents a graphical depiction of part of the source sound item. For instance, the content creation module 202 can present a sound wave depiction of a portion of the sound item.

In block 606, the content creation module 202 presents the graphical selection unit 418 over a portion of the source sound item. The graphical selection unit 418 has a size (e.g., width) which defines the temporal length of the sound segment that it demarcates.

In block 608, the content creation module 202 allows the user to iteratively select a desired segment of the source sound item by repeatedly moving the position and/or size of the graphical selection unit 418, in conjunction with repeatedly playing back the segment demarcated by the graphical selection unit 418.

In block 610, the content creation module 202 optionally allows the user to choose transition effects that appear at the beginning and/or end of the selected sound item. The transition effects can correspond to a fade in effect at the beginning of the segment and a fade out effect at the end of the segment.

In block 612, the content creation module 202 can save the finally selected sound item in response to a save instruction from the user.

In block 614, the content synchronization module 208 can propagate presence information to the user's contacts, which alerts the contacts to the existence of the new sound item. The contacts can then request and receive the new sound item.

The right-hand portion of FIG. 6 includes a series of blocks that expand on the manner in which the content creation module 202 allows a user to iteratively select a desired segment of the source sound item. In block 616, the content creation module 202 receives the user's instruction to move the graphical selection unit 418 and/or adjust the size (e.g., width) of the graphical selection unit 418. In block 618, the content creation module 202 receives the user's instruction to play back the portion demarcated by the graphical selection unit 418. The loop-around arrow that points back to block 616 indicates that the user can perform the series of operations (616, 618) any number of times until the user is satisfied with the selected sound item.

Figure 7:
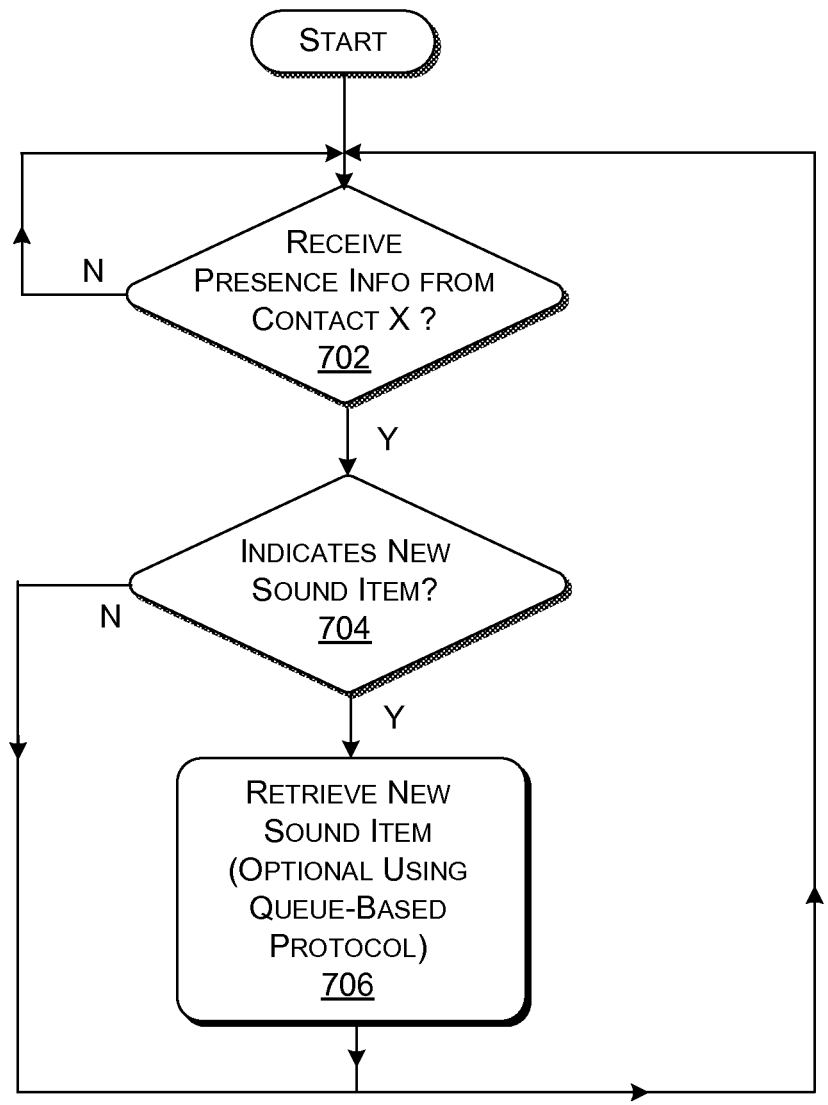
FIG. 7 is a flowchart which shows an illustrative procedure for use by a user device in receiving a new sound item.

FIG. 7 shows an illustrative procedure 700 for allowing a device (such as representative second 108) to receive a new content item from another device (such as the representative first device 106). A first user operates the first device 106 and a second user operates the second device 108.

In block 702, the second device 108 determines whether it has received new presence information from the first device 106. In this example, the user of the first device 106 correspond to contact X.

If block 702 is answered in the affirmative, in block 704, the second device 108 determines whether the presence information identifies a new sound item. The second device 108 can make this determination by comparing newly received reference information with previously received reference information, or by determining that there is no previously received reference information.

If block 704 is answered in the affirmative (meaning that the presence information identifies a new sound item), in block 706, the second device 108 requests the first device 106 to supply the new sound item. In response, the second device 108 receives this new sound item. As stated above, the second device 108 can alternatively obtain the new sound item from a server-side source, such as the network store 130.

Figure 8:
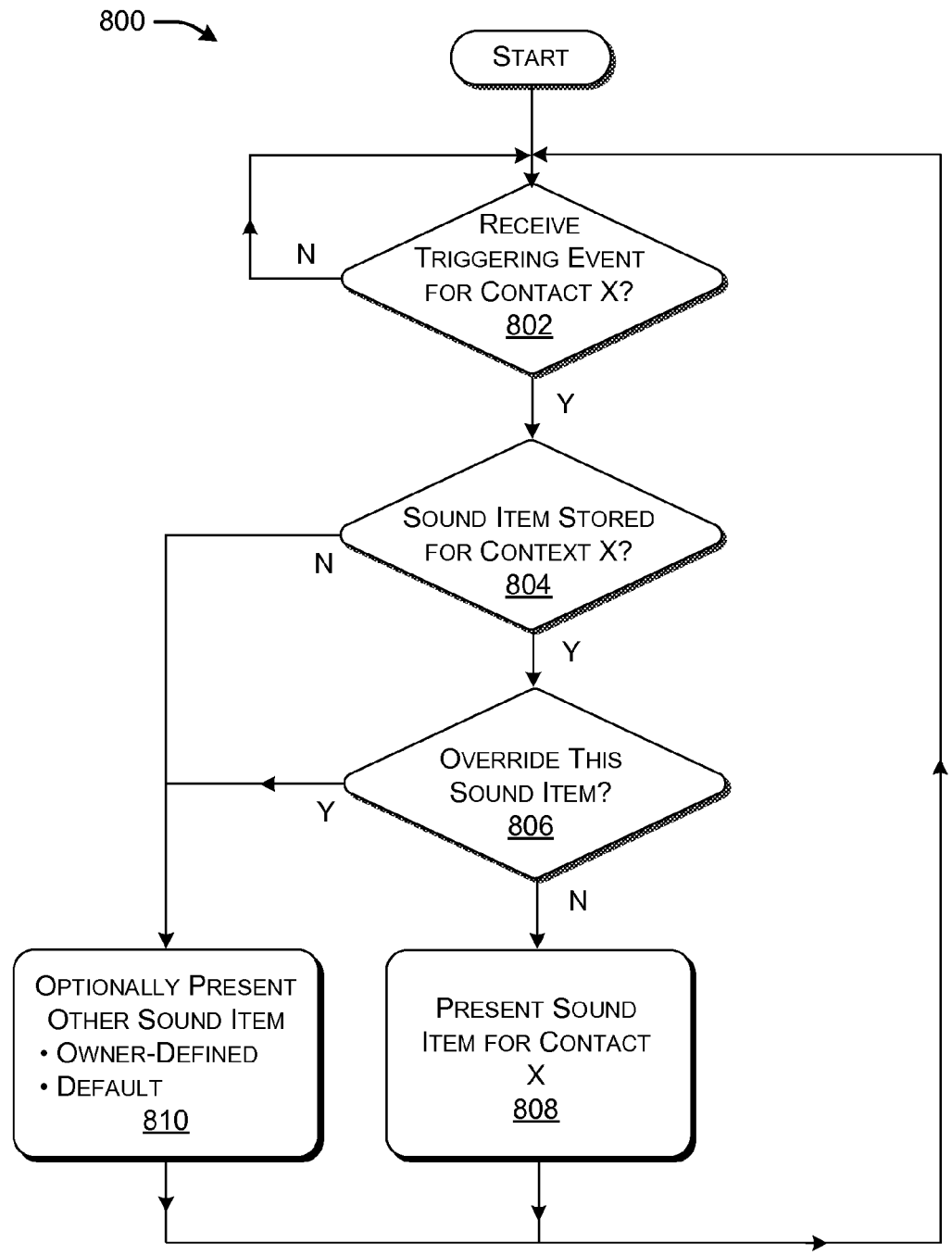
FIG. 8 is a flowchart which shows an illustrative procedure for use by a user device in presenting a sound item in response to a triggering event.

FIG. 8 shows a procedure 800 for playing a sound item received by a device (such as the representative second device 108) from another device (such as the representative first device 106). A first user operates the first device 106 and a second user operates the second device 108.

In block 802, the second device 108 determines whether it has received a triggering event associated with the first user.

If block 802 is answered in the affirmative, in block 804, the second device 108 determines whether it has a sound item created by the first user.

If block 804 is answered in the affirmative, in block 806, the second device 108 determines whether the second user (of the second device 108) has previously entered an instruction to override the sound item created by the first user.

If block 806 is answered in the negative (meaning that the user has not entered an instruction to override the sound item), then, in block 808, the second device 108 presents the first user's sound item to the second user.

If block 806 is answered in the affirmative (meaning that the second user has entered an instruction to override), then the second device 108 can optionally present another sound to the second user. In one case, the second device 108 can present a sound item specifically defined by the second user for the first user. In another case, the second device 108 can present a default sound that it presents for all users that invoke a triggering event.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. One or more computer-readable storage devices storing computer-executable instructions that, when executed, cause one or more processors to perform operations comprising:
   receiving presence information that includes a reference to a sound item that has been selected by a user of a device to be associated with the user;
   determining whether or not another device has received the sound item based at least in part on the presence information; and
   causing the sound item to be presented via the other device when it is determined that the other device has received the sound item and causing another sound item to be presented via the other device when it is determined that the other device has not received the sound item, the other sound item having been previously selected to be associated with the user.

2. The one or more computer-readable storage devices of claim 1, wherein the operations further comprise:
   in response to determining that the other device has not received the sound item, requesting the sound item from at least one of the device or a communication infrastructure.

3. The one or more computer-readable storage devices of claim 1, wherein the receiving the presence information is performed using peer-to-peer communication.

4. The one or more computer-readable storage devices of claim 1, wherein the sound item is sent to the other device using a queue-based protocol.

5. The one or more computer-readable storage devices of claim 1, wherein the operations further comprise:
   identifying an occurrence of a triggering event that triggers a presentation of at least one of the sound item or the other sound item; and
   wherein at least one of the sound item or the other sound item is caused to be presented via the other device in response to identifying the occurrence of the triggering event.

6. The one or more computer-readable storage devices of claim 5, wherein the triggering event comprises at least one of logging the user into the device or sending an Instant Messaging (IM) communication to the other device.

7. One or more computer-readable storage devices storing computer-executable instructions that, when executed, cause one or more processors to perform operations comprising:
   identifying an occurrence of a triggering event that triggers a presentation of at least one of a first sound item or a second sound item, the first sound item and the second sound item having been selected by a user of a first device;
   determining whether or not a second device includes the first sound item;
   in response to determining that the second device includes the first sound item,
     determining whether or not there is an override of the first sound item at the second device;
     in response to determining that there is not an override of the first sound item at the second device, presenting the first sound item via the second device; and
     in response to determining that there is an override of the first sound item at the second device, preventing the first sound item from playing at the second device; and
   in response to determining that the second device does not include the first sound item, presenting the second sound item via the second device.

8. The one or more computer-readable storage devices of claim 7, wherein the triggering event comprises at least one of the user logging into a real-time communications system or the user logging off the real-time communications system.

9. The one or more computer-readable storage devices of claim 7, wherein the triggering event comprises sending a communication to the second device via a real-time communications system.

10. The one or more computer-readable storage devices of claim 7, wherein the first sound item comprises a newly created sound item that has been associated with the user.

11. A method, comprising:
    receiving presence information related to a user of a first device, the presence information identifying a first sound item that has been selected by the user to indicate an event related to the use of a real-time communications system by the user;
    determining whether or not the first sound item has been provided to a second device based at least in part on the presence information; and
    causing the first sound item to be presented via the second device when it is determined that the first sound item has been provided to the second device and causing a second sound item to be presented via the second device when it is determined that the first sound item has not been provided to the second device, the second sound item having been previously selected by the user to be associated with the user.

12. The method of claim 11, further comprising:
    determining that an event has occurred; and
    wherein at least one of the first sound item or the second sound item is caused to be presented in response to determining that the event has occurred.

13. The method of claim 12, wherein the event comprises at least one of receiving a real-time communication from the first device, logging the user into the real-time communications system, or logging the user off the real-time communications system.

14. The method of claim 11, further comprising:
    causing at least one of the first sound item or the second sound item to be stored in a data store; and
    providing at least one of the first sound item or the second sound item to the second device in response to a user of the second device logging onto the second device.

15. The method of claim 11, further comprising:
    causing an action item to be placed in a queue upon receiving the presence information; and
    sending the first sound item to the second device when the action item comes due in the queue.

16. The method of claim 11, further comprising:
    before receiving the presence information, causing display of a graphical depiction of at least part of a source sound item;
    causing a graphical selection unit to be displayed over a segment of the source sound item within the displayed part of the source sound item, the graphical selection unit comprising a window having a beginning endpoint and an ending endpoint which together demarcate the segment of the source sound item; and receiving an instruction to save the segment of the source sound item as the first sound item.

17. The method of claim 16, further comprising:

receiving an instruction to move at least one of the beginning endpoint or the ending endpoint of the graphical selection unit; and causing the segment of the source sound item to be played in response to receiving the instruction to move at least one of the beginning endpoint or the ending endpoint of the graphical selection unit.

18. The method of claim 17, further comprising:

receiving another instruction to move at least one of the beginning endpoint or the ending endpoint of the graphical selection unit; and causing the segment of the source sound item to be played again in response to receiving the other instruction to move at least one of the beginning endpoint or the ending endpoint of the graphical selection unit.

19. The method of claim 16, further comprising:

receiving an instruction to move a position of the graphical selection unit forward or backward within the source sound item; and causing the position of the graphical selection unit to be moved in response to receiving the instruction to move the position of the graphical selection unit forward or backward within the source sound item.

20. The method of claim 16, further comprising:

receiving a selection of a transition effect to be played at the beginning or at the end of the segment of the source sound item, or both at the beginning and at the end of the segment of the source sound item.

* * * * *